United States Patent
Cline et al.

(10) Patent No.: US 6,204,853 B1
(45) Date of Patent: Mar. 20, 2001

(54) 4D KAPPA5 GAUSSIAN NOISE REDUCTION

(75) Inventors: Harvey Ellis Cline, Schenectady, NY (US); Allen Robert Tannenbaum, Edina, MN (US)

(73) Assignee: General Electric Company, Schenectady, NY (US)

(*) Notice: Subject to any disclaimer, the term of this patent is extended or adjusted under 35 U.S.C. 154(b) by 0 days.

(21) Appl. No.: 09/058,100

(22) Filed: Apr. 9, 1998

(51) Int. Cl.$^7$ .................................................. G06K 9/40
(52) U.S. Cl. .................... 345/424; 345/419; 345/420; 382/128; 382/260; 382/266; 382/269; 382/275
(58) Field of Search .................... 345/424, 419, 345/420, 428; 382/128, 130, 131, 168, 260, 266, 275, 236, 269, 199, 254, 263

(56) References Cited

U.S. PATENT DOCUMENTS

| | | | |
|---|---|---|---|
| 5,245,282 | * 9/1993 | Muggler | 324/309 |
| 5,412,563 | * 5/1995 | Cline | 345/429 |
| 5,461,655 | * 10/1995 | Vuylsteke | 378/62 |
| 5,594,807 | * 1/1997 | Liu | 382/168 |
| 5,799,111 | * 8/1998 | Guissin | 382/254 |
| 5,930,384 | * 7/1999 | Guillemaud | 382/131 |

OTHER PUBLICATIONS

"A Geometric Snake Model for Segmentation of Medical Imagery" by A. Yezzi, S. Kichenassany, A. Kumar, P. Olver and A. Tannenbaum, IEEE Transactions on Medical Imaging, vol. 16, pp. 199–209, 1997.

"Matrix Theory and Linear Algebra", Section 5.5, pp. 246–252, MacMillan Publishing Company, New York, 1988.

"Invariant Geometric Evolutions of Surfaces and Volumetric Smoothing", P. J. Olver, G. Sapiro, A. Tannenbaum, SIAM J. Appl. Math, vol. 57, No. 1, pp. 176–194, Feb. 1997.

* cited by examiner

Primary Examiner—Mark R. Powell
Assistant Examiner—Wesner Sajous
(74) Attorney, Agent, or Firm—Jean Testa; Donald S. Ingraham

(57) ABSTRACT

The noise reduction system of the present invention takes into account that noise is random with little between images adjacent physically, and in sampling time. It also takes into account the fact that some sequences of images are cyclical and "wrap around" in time with the beginning closely resembling the end of the cycle. A filter was developed which would smooth noise in a direction along an edge, but will not blur across an edge. It operates by determining vectors tangential to a surface point p, at a current voxel, and projecting 4D data onto the tangential vectors. A curvature matrix $B_{\alpha\beta}$ is determined. The eigenvalues of curvature matrix $B_{\alpha\beta}$ are determined to result in three curvatures for 4 dimensions. If the sign of all of the eigenvalues is the same, the current voxel is filtered, else, it is unchanged. This filtering is repeated for a number of voxels as the current voxel within a desired region for a single iteration. Preferably, this is repeated for several iterations to result in filtered data with reduced noise and little change in detail. The filtered data may then be segmented to separate structures. The segmented structures may then be used in analysis, such as in medical diagnosis.

7 Claims, 2 Drawing Sheets

4D KAPPA5 GAUSSIAN NOISE REDUCTION

BACKGROUND OF THE INVENTION

1. Scope of the Invention

The present invention relates to image processing and more specifically for reducing noise in a sequence of images.

2. Discussion of Prior Art

Imaging, and identification of separate objects is important in various disciplines. Uses may include imaging for medical diagnosis, machine vision, and identification of objects in pictures or videos. To simplify matters, the discussion here will concentrate on medical imaging, however, this may easily apply to other image processing applications.

One specific use for segmentation in medical imaging is for diagnosing coronary artery disease, the leading cause of death in the United States and a major contribution to health care costs. Medical images are acquired and segmented into blood pools and artery surfaces to determine if coronary arteries are blocked, typically leading to major cardiac problems. Despite recent advances in magnetic resonance (MR) cardiac imaging, x-ray catheterization coronary angiography has less noise and is the definitive examination for coronary artery disease. The vessel morphology is examined from different viewpoints using contrast material injected with a catheter into either coronary vessels which are examined with fluoroscopic imaging techniques. If the coronary vessels could be examined and diagnosed with MR imaging, patients with insignificant disease may not have to undergo painful catheterization.

Several methods exist to post process images to determine the boundaries of vessels to diagnose if the vessels are blocked. One such method is a "snake" algorithm as described in "A Geometric Snake Model for Segmentation of Medical Imagery" by A. Yezzi, S. Kichenassamy, A. Kumar, P. Olver, and A. Tannenbaum, IEEE Transactions on Medical Imaging, vol. 16, pp. 199–209, 1997, which tries to approximate curved boundaries by mathematically deforming a curved "snake" to match the boundary. These methods do not work well when the data has a large degree of noise, common in MR cardiac imaging and typically produce inaccurate results.

Currently, there is a need for a system which reduces noise in images with little effect upon detail, such that boundaries of the vessels may be determined.

BRIEF DESCRIPTION OF THE DRAWINGS

While the novel features of the invention are set forth with particularity in the appended claims, the invention, both as to organization and content, will be better understood and appreciated, along with other objects and features thereof, from the following detailed description taken in conjunction with the drawings, in which:

SUMMARY OF THE INVENTION

Figure 1:
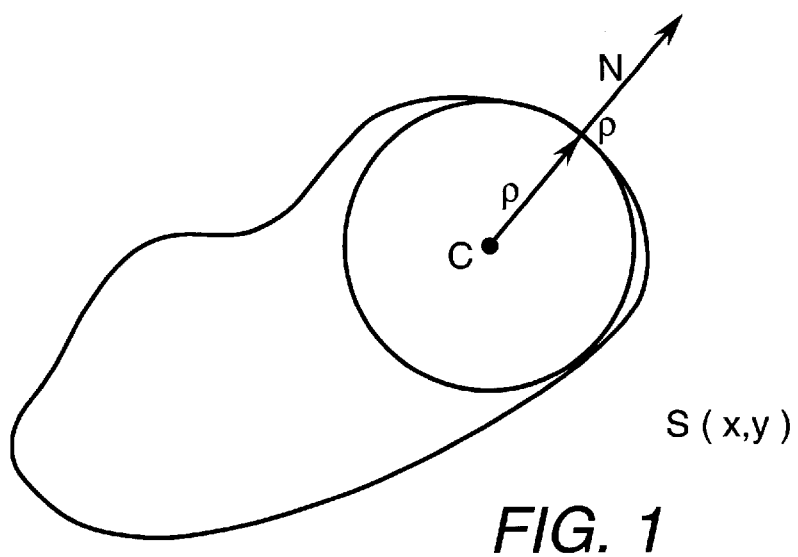
FIG. 1 is an illustration of a radius of curvature for 2 dimensions. used by the present invention in reducing noise.

The method of reducing noise in images while preserving edge information operates on a multidimensional set of images S each which vary at least over D dimensions. For temporal cardiac MR imaging, D=4.

A current voxel at a point p on a surface is first chosen to be filtered.

A set of first differences $S_i = dS/di$ around current voxel is determined for each of the D dimensions.

A plurality of second differences $S_{ij}$, are calculated from the first differences, where indices i, j represent each of D dimensions.

D-1 tangent vectors $e_1, e_2, \ldots e_{D-1}$, at point p are calculated.

Second differences $S_{ij}$ are projected onto tangent vectors $e_1, e_2, \ldots e_{D-1}$ to result in a curvature matrix $B_{\alpha\beta}$.

The curvature matrix $B_{\alpha\beta}$ is diagonalized to diagonal elements being curvatures $K_1, K_2, \ldots K_{D-1}$;

The signs of the curvatures $K_1, K_2, \ldots K_{D-1}$, are tested, and if the curvature signs are the same:

a cofactor $\Delta_{ij}$ is calculated from $S_{ij}$, and current voxel value $S_w$ at point p is modified according to the equation:

$$S_{w+1} = S_w + \sum_{i=1}^{4}\sum_{j=1}^{4} (S_i S_j \Delta_{ij})^{1/5}$$

to result in the new filtered value $S_{w+1}$.

These steps are repeated for a number of different voxels as current voxel in a desired region to result in filtered data $S_{w+1}$. Typically, several iterations are performed to result in filtered data having reduced noise with little change in detail.

This filtered data may be processed with snake algorithms to determine boundaries used in different types of image segmentation. This is also very useful in determining blockage in coronary vessels.

OBJECTS OF THE INVENTION

It is an object of the present invention to provide a method to filter data in a multi-dimensional sense without blurring edges of structures in the image.

It is another object of the present invention to provide a non-invasive system that automatically segments multi-dimensional volumetric images into separate structures.

DETAILED DESCRIPTION OF THE INVENTION

Visualization of boundaries of objects is very useful in many disciplines. The present description will focus on one of these applications, however it is understood that the present invention will be equally useful in any image segmentation where object boundaries are to be determined from a number of adjacent images, in time and space.

Identification of regions belonging to the same structure and boundaries identifying these structures is known as segmentation. This technique is useful in diagnosis of many disorders. For example segmentation is the key to diagnosis and prevention of serious coronary disease. By identifying the vessel walls and the blood pool as separate structures, one can visually determine blockage of the vessels. The problem is to identify the structure boundaries.

Many post processing algorithms work on the acquired images which try to discern the boundaries of the structures. Many of these, such as "snake" algorithms, do not produce accurate results when the image data set has a great deal of noise. A general blurring of the data set reduces noise, but also reduces the sharpness representing edges, which are used to determining the boundaries of the vessels. The challenge is to remove noise but retain clear demarcations between adjacent objects to allow determination of the vessel boundaries.

Theory

In FIG. 1, a 2 dimensional (2D) surface S(x,y) is shown which varies along axes x and y. Smoothing of noise is to occur at a surface point p. The normal vector at surface point p is N. The curvature K at point p is 1/p where p is the radius of curvature, being the distance between surface point p and center of curvature point c.

A Gaussian curvature is simply the curvature K in this example.

Figure 2:
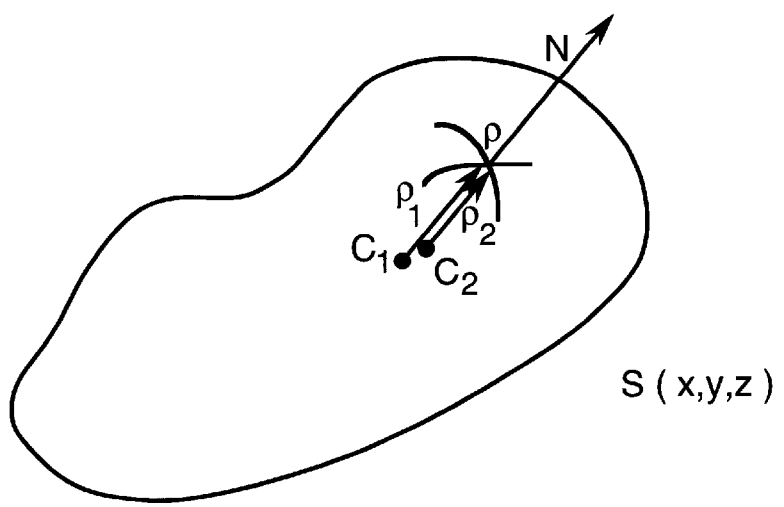
FIG. 2 is an illustration of a radius of curvature for 3 dimensions.

In FIG. 2, a three dimensional (3D) surface S(x,y,z) is shown. In this figure, the 3D surface S(x,y,z) has a normal vector N at the point p. This point has a radius of curvature in two orthogonal dimensions, being $\rho_1$ and $\rho_2$. Radius $\rho_1$ is a measure from center of curvature $c_1$ to point p. Similarly, radius $\rho_2$ is a measure from center of curvature $c_2$ to point p.

There are 2 curvatures of point p, $K_1$ and $K_2$ which are:

$$K_1 = 1/\rho_1 \text{ and } K_2 = 1/\rho_2 \tag{1}$$

A Gaussian curvature K for 3D surface of FIG. 2 is:

$$K = \frac{1}{\rho_1 \rho_2} \tag{2}$$

Curvature becomes important since the goal of the present invention is to smooth out noise along an edge (also referred to as a boundary), but not across an edge. This simple, but useful idea is easy to visualize in three dimensions, but becomes more difficult in more than three dimensions.

If a series of 3D images, or data representing images which may be interpreted in three dimensions, are acquired over a time series, a 4D data set is the result, with the fourth dimension being time of acquisition. This acquisition time may be cyclical, where the 1st sampling of the sequence follows the last sampling of the sequence. It is also possible that this time not correspond to an absolute time, but be a time relative to a periodic cycle, such as a cardiac cycle.

The multi-dimensional surface, such as a 3D surface of a beating heart, which changes according to the cardiac cycle, is referred to as a hypersurface, and represented by S (dimension1, dimension2, dimension3, dimension4 . . . ). This means that in general, the hypersurfaces may depend upon an arbitrary number of dimensions. For temporal cardiac MR imaging, the number of dimension is 4, that is, three spatial dimensions AN/time.

FIG. 2 may be extrapolated to a hypersurface of more than 3D having a normal vector N from a point p on the hypersurface. This would result in D−1 (principal) curvatures, which are used to determine a Gaussian curvature K.

A 4D hypersurface will be discussed, with the realization that to the present invention is applicable to hypersurfaces with more and/or different dimensions.

It is desirable to determine a normal to the hypersurface, and a direction along the hypersurface. This will determine which direction to blur the data, along the hypersurface, and which direction not to blur the data, a direction normal to the hypersurface.

Noise is assumed to be small bumps and valleys in an intensity profile. This applies to both 3D or in hyperdimensions. In 4D it is an intensity blip for a given period of time, such as dust specs on a movie film which blows away after a period of time.

A first partial derivative of the surface S(x,y,z,t) with respect to spatial dimensions, x, y, z, referred to as $S_x$, $S_y$, $S_z$, respectively, will show how intensity changes as one moves across the image in a given dimension.

$$S_x = \frac{\partial S(x, y, z, t)}{\partial x}; S_y = \frac{\partial S(x, y, z, t)}{\partial y}; S_z = \frac{\partial S(x, y, z, t)}{\partial z} \tag{3}$$

A first partial derivative of the surface S(x,y,z,t) with respect to time t will be referred to as $S_t$ shows where edges pass through a given location over time.

$$S_t = \frac{\partial S(x, y, z, t)}{\partial t} \tag{4}$$

The second derivatives determine local maxima and minima.

$$\frac{\partial^2 S(x, y, z, t)}{\partial x^2}; \frac{\partial^2 S(x, y, z, t)}{\partial y^2}; \frac{\partial^2 S(x, y, z, t)}{\partial z^2}; \frac{\partial^2 S(x, y, z, t)}{\partial t^2}; \tag{5}$$

these will be referred to as:

$S_{xx}$, $S_{yy}$, $S_{zz}$, $S_{tt}$, respectively.

Second derivatives would also include mixed second derivatives which are partial derivatives of different variables, such as:

$$\frac{\partial^2 S(x, y, z, t)}{\partial x \partial t} = S_{xt}, \text{ etc.} \tag{6}$$

It should also be noted that:

$$\frac{\partial^2 S(x, y, z, t)}{\partial x \partial t} = S_{xt} = \frac{\partial^2 S(x, y, z, t)}{\partial t \partial x} \tag{7}$$

From this, an equation for (4D) Gaussian Curvature may be calculated:

$$K = \sum_{i=1}^{4} \sum_{j=1}^{4} \frac{S_i S_j \Delta_{ij}}{|N|^5} \tag{8}$$

where $\Delta_{ij}$ is the cofactor of $S_{ij}$, and INI is the square root of the sum of the squares of the partial derivatives $S_x$, $S_u$, $S_z$, $S_t$.

Figure 3:
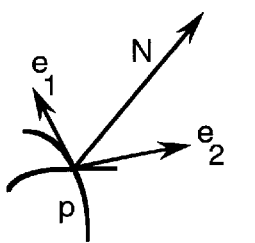
FIG. 3 is an illustration of the relative orientation of a vector normal to point p and tangent vectors $e_1$, $e_2$ tangential to a 3D surface at point p.

In FIG. 3, a set of vectors $e_1$, $e_2$, . . . $e_{D-1}$ tangent to point p along each orthogonal to the Normal to point p are determined. For example, a normal vector having dimensions $S_x$, $S_y$, $S_z$, $S_t$ has tangent vectors:

$$e_1 = (-S_t, 0, 0, S_x) \tag{9}$$

$$e_2 = (0, -S_t, 0, S_y) \tag{10}$$

$$e_3 = (0, 0, -S_t, S_z) \tag{11}$$

Once the tangent vectors are determined, and the second derivatives $S_{ij}$ are determined, a curvature matrix $B_{\alpha\beta}$ may be determined according to:

$$B_{\alpha\beta} = e_{\alpha i} S_{ij} e_{\beta j} \tag{12}$$

where the $e_{\alpha i}$ define the 3×4 matrix whose α-th row is given by $e_i$ for I, j=1, 2, 3, 4 and a, b,=1, 2, 3.

The curvature matrix $B_{\alpha\beta}$ may then be diagonalized by determining its eigenvalues. The diagonal eigenvalues are then $K_1$, $K_2$, and $K_3$.

For example, if there are 4 dimensions, each tangent vector e will be a 1×4 vector. Second derivative matrix $S_{ij}$ will be a 4×4 matrix. This would result in a 3×3 curvature matrix $B_{\alpha\beta}$.

If curvatures $K_1$, $K_2$, $K_3$ do not all have the same sign, then the point being tested is a saddle point, and not a local minima, or maxima. These saddle points should be unaltered.

However, if all curvatures $K_1$, $K_2$, $K_3$ have the same sign, then surface point p is a local maxima or minima. These are the points which should be filtered.

If all curvatures $K_1$, $K_2$, $K_3$ have the same sign, then the change in image intensity for tested point should be:

$$\frac{dS}{dw} = S_w = K^{1/5}|N| \qquad (13)$$

therefore, current voxel is updated according to:

$$S_{w+1} = S_w + \sum_{i=1}^{4}\sum_{j=1}^{4}(S_i S_j \Delta_{ij})^{1/5} \qquad (14)$$

where w is the iteration number. $S_{w+1}$ is intensity in pixel intensity after the filter is applied to the point being tested, current voxel. $S_w$ is the intensity just before filtering. The filtering is repeated for other points of the dataset which are to be filtered. Once this has been accomplished for all points of all images and times desired to be filtered, a complete iteration w has been completed. The present invention is most effective when multiple iterations w have been performed on the data set. Therefore, an entire filtering iteration may be repeated several times to result in images with reduced noise with edges and boundaries preserved.

DIGITAL IMPLEMENTATION

A digital implementation of the mathematical filtering described above would calculate, about a center voxel, intensity differences between the right and left voxels divided by the voxel spacing in this direction as an "x" difference, approximating dx; intensity differences between back and front voxels divided by the voxel spacing in that direction as a "y" difference, approximating dy; intensity differences between the top and bottom voxels divided by the voxel spacing in that direction, as an "z" difference, approximating dz; and intensity differences between the center voxel at times t+1 and t−1 divided by the time between times t+1 and t−1, as an "t" difference, approximating dt.

After filtering several times, smoothing occurs along the direction of an edge, but not across an edge. This preserves the edges and reduces noise in that area. The smoothed data may then be post processed with a number of known boundary determination methods to result in the vessel boundary. This vessel boundary may then displayed by a moving 3D image, which generally repeats its motion each cardiac cycle.

HARDWARE

Figure 4:
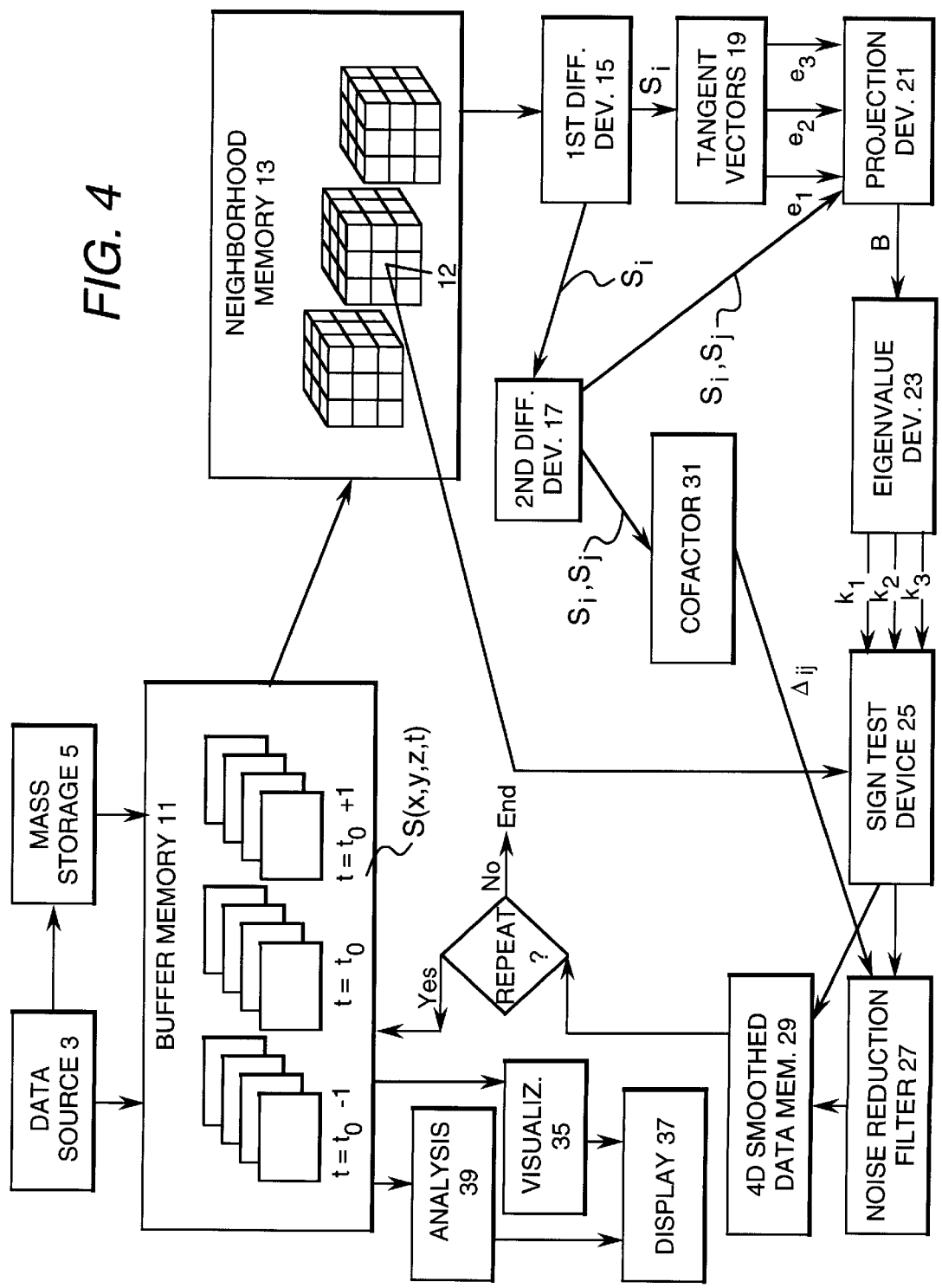
FIG. 4 is an illustration of a simplified block diagram of one embodiment of the present invention.

FIG. 4 shows a simplified block diagram of the present invention.

A buffer memory 11 is filled with data which is multidimensional. One type of multidimensional data would be a plurality of two-dimensional "slices" for each given time period over a plurality of time periods as shown graphically in FIG. 4 inside buffer memory 11. This data may come directly from a data source 3, such as a magnetic resonance (MR) scanner, which may provide the information directly to buffer memory 11, or pass the information to a mass storage device 5 which can alternatively pass the information onto buffer memory 11.

A neighborhood memory 13 receives a neighborhood of adjoining voxels around a given active voxel. This would include all physically adjacent voxels from the buffer memory 11, and all voxels which are "adjacent" in time, thereby resulting in voxels from time $t_{-1}$ and voxels from $t_1$ where $t_0$ is the acquisition time of the current voxel 12 being selected to be filtered.

A first differences device 15 is connected to neighborhood memory 13 and, with reference to current voxel 12 being the central voxel at time $t_0$, determines differences $S_x$, $S_y$, $S_z$, $S_t$ for current voxel 12.

These first differences are then passed to a second differences device 17 where each of the second differences $S_{xx}$, $S_{xy}$, $S_{xz}$ ... $S_{pt}$ are determined from the first differences. These second differences are calculated from the differences of the appropriate first differences using the centered differencing procedure described above.

A tangent vector device 19 receives the first differences from first difference device 15 and calculates vectors $e_1$, $e_2$, ... $e_{D-1}$ where D is the number of dimensions. For 4 dimensions, vectors $e_1$, $e_2$, $e_3$ each are 1×4 vectors where the four dimensions are x, y, z, t. These vectors are gradients in the respective x, y and z directions and have magnitude related to $S_x$, $S_y$, $S_z$.

A projection device 21 receives tangent vectors $e_1$, $e_2$, $e_3$ from tangent device 19, and also receives the second differences $S_i$, $S_j$ from the second differences device 17 and projects the $S_i$, $S_j$ (4×4) matrix onto the tangential vectors $e_1$, $e_2$, $e_3$. This results in a 3×3 curvature matrix B.

An Eigenvalue device 23 receives the curvature matrix B and diagonalizes curvature matrix B to result in a diagonal 3×3 matrix having all zeroes except the diagonal elements $K_1$, $K_2$, $K_3$, which are the three curvatures, respectively.

The three curvatures are sent to a sign test device 25 which determines if all the curvatures are of the same sign. Sign test device 25 is also coupled to neighborhood memory 13 and receives current voxel 12 being tested. If the signs of the three curvatures $K_1$, $K_2$, $K_3$ are not equal, then the voxel value for current voxel 12 is simply passed unchanged into a 4-D smooth data memory 29.

It is important to note that any or all of the memories described in this invention may be different parts of a larger memory or in the alternative sense may physically be different memory devices.

A cofactor device 31 is coupled to second differences device 17 and receives output of second differences device being $S_i$, $S_j$ and determines the cofactor $\Delta_{ij}$. A quick review of cofactors is provided in "Matrix Theory and Linear Algebra", Section 5.5, pp. 246–252, MacMillan Publishing Company, New York, 1988.

A noise reduction filter 27 is coupled to cofactor $\Delta_{ij}$ 31 and receives the cofactor $\Delta_{ij}$ and is also coupled to first differences device 15. Noise reduction filter 27 is also coupled to sign test device 25 which provides the value of current voxel 12 to it provided that the signs of curvatures $K_1$, $K_2$ and $K_3$ are all of the same sign. The value of current voxel 12 is then adjusted by noise reduction filter 27 to its filtered value as defined by equation (14). Noise reduction filter 27 then stores the current smooth voxel value in 4D smooth data memory 29.

The present invention operates to filter all voxels of a desired volume with a first iteration, w=1, before starting a second iteration of the voxels w=2. At the end of the first iteration, smoothed data is stored in 4D smooth data memory 29. Just prior to processing the next iteration of each voxel of the desired volume, 4D smooth data memory 29 is copied into buffer memory 11. In another embodiment it may replace corresponding data values. The entire process may then be repeated for a second iteration, (i.e. w=2) operating on the data from the previous smoothing iteration. This process may continue for any desired number of iterations w.

After the desired number of iterations w have been completed, the smooth filtered data may then be manipulated and rendered by conventional means to display the smoothed multidimensional data on a visualization device 35 working in coordination with a display device 37. Alternatively, an analysis device 39 may be implemented to perform visual analysis and image processing of structures which it may display on display device 37.

While several presently preferred embodiments of the present novel invention have been described in detail herein, many modifications and variations will now become apparent to those skilled in the art. It is our intent therefore, to be limited only by the scope of the appending claims and not be the specific details and instrumentalities presented by way of explanation herein.

What we claim is:

1. A method of reducing noise in images while preserving edge information comprising the steps of:
   a) acquiring a multidimensional set of images S each which vary at least over D dimensions, comprised of a set of voxel values;
   b) selecting a current voxel at a point p to be filtered;
   c) determining a plurality of first differences $S_i=dS/di$ at the current voxel, where i represents each of D dimensions;
   d) determining a plurality of second differences $S_{ij}$, from the first differences, where indices i, j represent each of D dimensions;
   e) determining D−1 tangent vectors $e_1, e_2, \ldots e_{D-1}$ at point p;
   f) projecting second differences $S_{ij}$ onto tangent vectors $e_1, e_2, \ldots e_{D-1}$ to result in a curvature matrix $B_{\alpha\beta}$;
   g) diagonalizing curvature matrix $B_{\alpha\beta}$ to determine a diagonal matrix with diagonal elements being curvatures $K_1, K_2, \ldots K_{D-1}$;
   h) testing the signs of the curvatures $K_1, K_2, \ldots K_{D-1}$, and if the curvature signs are the same:
      i. calculating a cofactor $\Delta_{ij}$ from $S_{ij}$;
      ii. modifying the current voxel value $S_w$ at point p according to:

$$S_{w+1} = S_w + \sum_{i=1}^{D}\sum_{j=1}^{D} (S_i S_j \Delta_{ij})^{\frac{1}{D+1}}$$

to result in the new filtered value $S_{w+1}$; and
   i) repeating steps "c" through "h" for a plurality of different voxels as the current voxel in a desired region to perform a filtering iteration resulting in filtered data $S_{w+1}$ having reduced noise with little change in detail.

2. The method of method of reducing noise in images while preserving edge information of claim 1 wherein the step of projecting second differences $S_{ij}$ onto tangent vectors $e_1, e_2, \ldots e_{D-1}$ comprises the steps of:
   determining $B_{\alpha\beta}$ according to:

$B_{\alpha\beta}=e_{\alpha i}S_{ij}e_{\beta j}$ where α, β represent tangent vector numbers, and i, j represent its dimensions.

3. The method of method of reducing noise in images while preserving edge information of claim 1 further comprising:
   repeating steps "b" through "i" for a plurality of iterations w.

4. The method of method of reducing noise in images while preserving edge information of claim 1 further comprising, after completing a desired number of iterations:
   applying a "snake" algorithm to the filtered data to identify boundaries and edges.

5. The method of method of reducing noise in images of claim 1 wherein:
   the multidimensional set of images S is 4D medical image data of the vessels of a beating heart having edges and inherent noise representing 3 spatial dimensions and a time dimension, being the phase within a cardiac cycle.

6. The method of method of reducing noise in images of claim 1 wherein:
   the "snake" algorithm is applied to the filtered data to result in images of boundaries of cardiac vessels.

7. A method of determining blockage of coronary vessel comprises the steps of:
   a) acquiring medical image data S of vessels of a beating heart of a subject having edges and inherent noise which varies at least over D dimensions, comprised of a set of voxel values;
   b) selecting a current voxel at a point p to be filtered;
   c) determining a plurality of first differences $S_i=dS/di$ at the current voxel, where i represents each of D dimensions;
   d) determining a plurality of second differences $S_{ij}$, from the first differences, where indices i, j represent each of D dimensions;
   e) determining D−1 tangent vectors $e_1, e_2, \ldots e_{D-1}$ at point p;
   f) projecting second differences $S_{ij}$ onto tangent vectors $e_1, e_2, \ldots e_{D-1}$ to result in a curvature matrix $B_{\alpha\beta}$;
   g) diagonalizing curvature matrix $B_{\alpha\beta}$ to determine a diagonal matrix with diagonal elements being curvatures $K_1, K_2, \ldots K_{D-1}$;
   h) testing the signs of the curvatures $K_1, K_2, \ldots K_{D-1}$, and if the curvature signs are the same:
      i. calculating a cofactor $\Delta_{ij}$ from $S_{ij}$;
      ii. modifying the current voxel value $S_w$ at point p according to:

$$S_{w+1} = S_w + \sum_{i=1}^{D}\sum_{j=1}^{D} (S_i S_j \Delta_{ij})^{\frac{1}{D+1}}$$

to result in the new filtered value $S_{w+1}$;
   i) repeating steps "c" through "h" for a plurality of different voxels as the current voxel in a desired region to perform a filtering iteration resulting in filtered data $S_{w+1}$ having reduced noise with little change in detail;
   j) analyzing and visualizing the filtered data to result in images of boundaries of the vessels; and
   k) displaying the vessel boundaries to an operator as a three dimensional image to aid in diagnosis of blockage of these vessels.

* * * * *